United States Patent [19]
Wilson et al.

[11] Patent Number: 5,225,947
[45] Date of Patent: Jul. 6, 1993

[54] LOW COST TIME INDEXED VOICE RECORDER SYSTEM

[75] Inventors: Glenn F. Wilson, Wright-Patterson AFB; Kevin Hall; Paul Benadum, both of Dayton, all of Ohio

[73] Assignee: The United States of America as represented by the Secretary of the Air Force, Washington, D.C.

[21] Appl. No.: 588,531

[22] Filed: Sep. 25, 1990

[51] Int. Cl.$^5$ .......................... G11B 5/00; G11B 5/02; G11B 15/18
[52] U.S. Cl. ........................ 360/72.1; 360/5; 360/55
[58] Field of Search ............ 360/5, 55, 72.2, 72.1, 360/27, 73.13, 74.4; 369/27, 28, 86; 455/346, 351, 348, 349; 358/108

[56] References Cited

U.S. PATENT DOCUMENTS

| | | | |
|---|---|---|---|
| 3,327,067 | 2/1963 | Boniface | 360/5 |
| 3,657,488 | 4/1972 | Pountney et al. | 179/100.1 |
| 4,012,784 | 3/1977 | Murphy et al. | 360/5 |
| 4,504,875 | 3/1985 | Kato et al. | 360/72.1 |
| 4,539,700 | 9/1985 | Sato | 453/351 |
| 4,729,381 | 3/1988 | Harada et al. | 128/671 |
| 4,888,654 | 12/1989 | Blum | 360/74.1 |

Primary Examiner—Aristotelis Psitos
Assistant Examiner—Varsha V. Sheladia
Attorney, Agent, or Firm—Gerald B. Hollins; Donald J. Singer

[57] ABSTRACT

A time indexed voice recording system wherein tone coded time signals are received on one channel of an entertainment grade stereophonic tape recorder and the desired voice signals entered into the other channel. The recording system is portable in nature and especially adapted for use in airborne missions where it can be placed within the clothing of an aircrewmember in even the smallest of aircraft cockpits. The tone code in the disclosed system is generated by a telephone compatible microcircuit system which also includes a microcomputer and software for system controlling purposes. The disclosure includes a flow diagram of the microcomputer software as well as a complete assembly language listing.

23 Claims, 5 Drawing Sheets

Microfiche Appendix Included
(21 Microfiche, 1 Pages)

LOW COST TIME INDEXED VOICE RECORDER SYSTEM

This patent includes a nonprinted microfische appendix disclosed computer program listing The appendix consists of 21 total pages contained on one microfische.

RIGHTS OF THE GOVERNMENT

The invention described herein may be manufactured and used by or for the government of the United States for all governmental purposes without the payment of any royalty.

BACKGROUND OF THE INVENTION

This invention relates to the field of audio frequency recording apparatus, and particularly to time indexed voice recordings made on magnetic tape media.

In order to study aircraft pilot and crewmember responses during actual airborne missions and simulated missions in ground based equipment it is often necessary to record the sequence of mission event related vocal comments made by the aircraft crewmembers. This vocal recording is necessary since the occurrence of mission related events often cannot be determined solely from the otherwise recorded aircraft, function parameters crewmember performance events, or physiological data changes. Such vocal recording is often accomplished, by providing a full time voice tape recorder connected with the aircraft communication system. The resulting recording therefore provides a permanent record of mission related comments.

Heretofore crewmembers using a recorder of this type have often been asked to report mission times along with their voiced descriptions of mission events. Using this arrangement, however, at playback, following the mission, a stop clock is often needed to determine when intervening mission events occurred. Such playback is a very time consuming task, however, especially since pilots often forget to..re port the time on their voice recordings. In such instances it is necessary to rewind the tape to the last time report, start a stop clock, and advance the tape in real time to the verbal report in interest in order to obtain its precise timing. This process often must be accomplished for many events of interest on each recorded tape.

In addition to being time consuming, this method is prone to errors especially from accidental tape stoppage or from tape stretching or other unpredicted events. In addition, the time required to transcribe such tapes restricts the utility of the obtained data since a timely turn around is often required for optimal data usage.

By using the time coded voice recording arrangement of the present invention, however, a recorded tape can be positioned anywhere along its length during playback and the recorded time immediately shown on the display provided. This capability which is in fact a manual random search mode, provides that once a specific voice signal is located, its time of occurrence is immediately known or can be precisely calculated. With this capability, timing from the last voice recorded time marker on a tape is no longer necessary.

The prior patent art includes several examples of recording systems which are of interest with respect to the recorder of the present invention; included in these patents is the patent of E. A. Boniface, U.S. Pat. No. 3,327,067 which is concerned with an aircraft cockpit sound recorder of the type used for aircraft accident investigation. The Boniface patent discloses the use of emergency energization of the recorder together with an impact operated switch in order to terminate the recorder operation at the time of an aircraft crash. The Boniface recorder also uses a continuous recorder or circulating loop recording media and employs an erase operation upon normal landing of the recorder monitored aircraft. Although it is also intended for use in an aircraft the recorder system of the present invention is distinguished over the Boniface recorder by the absence of time signals, by the Boniface back of recorder portability and other aspects described below.

Also included in this patent art is the patent of L. H. Poutney et al U.S. Pat. No. 3,657,488, which relates to a work study recording system intended for use in the analysis of operator performance in a manufacturing environment. The Poutney et al patent includes the use of a recorded timing signal to identify the start and finish of each operation performed by the timed operator and uses the same one data channel of the recorded media for both the time signal and recorded voice data. The time coding arrangement, the single signal recording channel, and other aspects of the Poutney apparatus are distinguished from the arrangement of the present invention.

This patent art also includes the patent of R. L. Murphy et al, U.S. Pat. No. 4,012,784, which is concerned with a two track cassette tape voice recording apparatus in which recordings are made on multiple different tapes, one for fast recall purposes. The Murphy patent also uses a combination of time signals and message start indication signals on the second of the recording tracks. The Murphy et al recorder is especially adapted for use in monitoring police, fire, and aircraft communication and contemplates intermittent actuation of the employed recording tapes with the message beginning indications in the time track being recorded at a special low frequency in order that they be inaudible during normal playback but become audio active during high speed transportation of the tape—for tape positioning purposes It is also notable that the Murphy et al recording arrangement contemplates use of binary coded decimal signals in a frequency shift keying arrangement for recording in the time track of the magnetic tape. Therefore at least the tape movement practices, the time signal coding, and the entertaining type of recording apparatus used in the present invention distinguish the present invention from the Murphy et al patent.

Also included in this patent art are the patent of C. Harada et al, U.S. Pat. No. 4,729,381, which is concerned with a medical recording apparatus for such information as blood pressure, heart rate, and breathing rate and is especially the usable in the generation of record sheets. The Harada et al apparatus includes provision for recording the times of detection of the medical information and means for controlling the recording device so as to record the medical indicia at the predetermined recording positions of the chart area. In the Harada et al patent the term "recording" appears to especially relate to the generation of a mark along a time graduated scale.

The recording accomplished according to the present invention is therefore believed to be distinguished over both these individual references and combinations of these references since inter alia the form of recording used in the present invention is distinguishable from that used in the prior art references and periphial aspects of the present invention recorder are also readily distinguished from those of the prior art.

SUMMARY OF THE INVENTION

The present invention provides a portable magnetic cassette recorder system which may be attached within the clothing of a pilot or other aircrewmember during actual or simulated flight missions and which by way of connection to the aircraft intercommunication system or other microphone inclusive apparatus provides a permanent record of conversation and other audio signals occurring during a flight mission. The recorder system is small and light in weight so as to be usable in even the smallest of aircraft cockpits and is arranged to be energized by self contained batteries rather than reliance on the aircraft power system. An important aspect of the recorder system concerns its use of an off the shelf entertainment grade tape recorder in order that cost be relatively low while maintaining desirably high quality recording capabilities. Another important aspect of the invention is concerned with its ability to preserve an ongoing sequence of fully coded time signals on the same tape used for the voice recording with the voice and time data being fixed in relative position and with the time data being recorded in the form of conveniently coded tones that are within the passband of the desired entertainment grade recorder. According to a yet further aspect of the invention these time markers on the tape are tone coded in accordance with the protocol used in the push button telephone dialing art.

It is an object of the present invention therefore to provide a fully portable and small sized voice recording apparatus.

It is another object of the invention to provide a portable voice recording apparatus in which time signals are recorded along with the voice data in separate recording channels.

It is another object of the invention to provide a low cost and possibly expendable recording system which provides desirably high quality data recordings.

It is another object of the invention to provide a voice recording system in which the recording medium, a magnetic tape, for example, moves continuously during the time of recording.

It is another object of the invention to provide a voice recording arrangement in which a permanent record of time is maintained.

It is another object of the invention to provide a time coding arrangement for a voice recorder in which the tone coding and decoding of time signals is accomplished with digital computer compatible apparatus.

It is another object of the invention to provide a voice and time recording arrangement in which the cost and performance advantageous of entertainment grade stereophonic recording equipment are supplemented with special purpose timing circuitry.

It is another object of the invention to provide a voice data recording apparatus in which the timing of voice data events may be discerned under both recording and playback conditions.

It is another object of the invention to provide a time and voice playback system in which recording and playback are accomplished with a single apparatus.

Additional and objects and features of the invention will be understood from the following description and claims and the accompanying drawings.

These and other objects of the invention are achieved by time indexed portable voice data recording and playback apparatus comprising the combination of; an off the shelf entertainment grade battery operated portable stereophonic magnetic tape recorder having left and right recording and playback channels for a cassette housed magnetic tape received therein; means including a voice responsive microphone for communicating an electrical signal representative of said voice data to the signal input port of a first one of said left and right recording channels; means including a plurality of timing circuit responsive audio frequency waveform tone generator circuits selectably and periodically connected with the recording input port for the second of said left and right recording channels for recording periodic bursts of ongoing time indicative tone code on said second of said magnetic tape left and right recording channels; means including time tone code burst decoding circuits for generating and displaying electrical signals representative of said ongoing time during playback of said magnetic tape.

DETAILED DESCRIPTION

Figure 1:
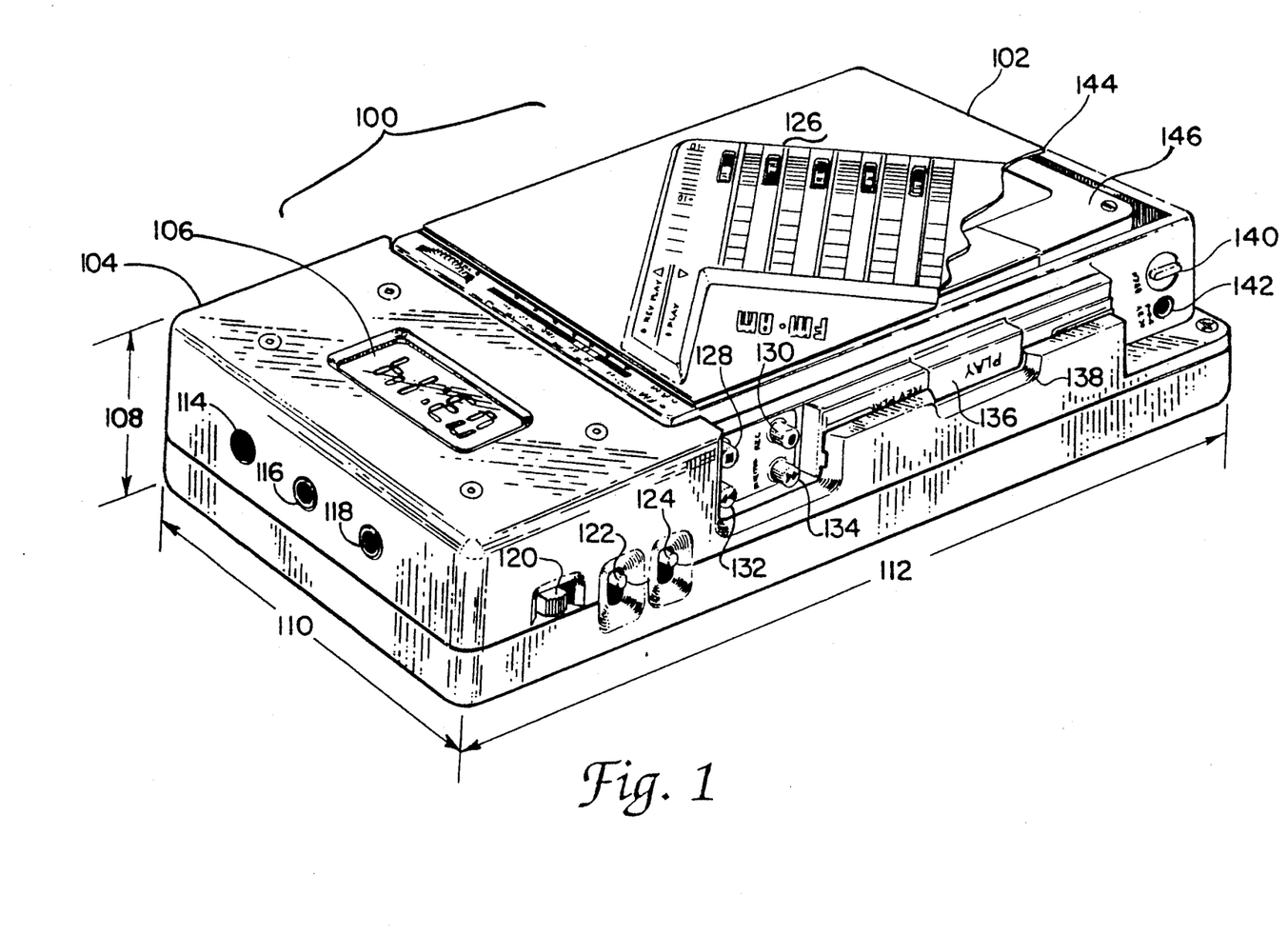
FIG. 1 shows an overall perspective view of a recording apparatus in accordance with the invention.

FIG. 1 of the drawings shows an overall perspective view of a recording apparatus made in accordance with the present invention. In the FIG. 1 drawing the recording system 100 is shown to include a portable entertainment type recorder and radio receiver 102 that is received in a housing 104 also used to contain the specialized timing circuitry of the present invention. Additional portions of the recording system 100 shown in FIG. 1 include the time display 106, and representative overall dimensions shown at 108, 110, and 112, these dimensions corresponding to a height dimension 108 of about 1.7 inch, a width dimension 110 of about 3.4 inches and a length dimension 112 of about 6.75 inches or 4.2 centimeters by 8.7 centimeters by 17.5 centimeters respectively.

Also shown in the FIG. 1 drawing are jacks 114, 116 and 118 by which DC power for operating the timing electronics may be supplied, output signal from the FIG. 1 system obtained, and input signal to the system provided respectively.

Other details of the FIG. 1 recording system appearing in FIG. 1 include the timing electronics on-off switch 120, the timing data "Enter" push button switch 122, the "Select" push button switch 124 and the recorder "Stop", "Record", and tape direction control push buttons 128, 130, 132, and 134 and the recorder "Play" button 136.

Additional recorder controls include the cassette ejecting button 140 and the power input/battery charging jack for the recorder at 142. Also shown in FIG. 1 is the 104 cutout 138 by which the recorder play button 136 is accessed and the graphic equalizer or tone controls 126 for the recorder. The cover of the recorder 102 in FIG. 1 is shown to be cutaway, at 144, in order that the tape cassette 146 received in the recorder be visible.

It should be understood that certain of the details shown in the FIG. 1 drawing are particularly adapted to one brand and model embodiment of the recorder 102. In FIG. 1 the illustrated recorder is in fact a AIWA ® brand stereo radio cassette recorder model HS-J600 which is manufactured by AIWA ® Company limited of Japan. The later AIWA ® Model HS-J700 recorder or similar recorders either with or without the AM/FM tuner apparatus and made by other manufacturers may be used in the recording system of the present invention with suitable physical changes in the FIG. 1 housing 104 and in other details of the present invention-as is indicated from time to time herein and as will be apparent to persons skilled in the art.

In the AIWA ® HS-J600 recorder the top lid, that is the surface on which the graphic equalizer controls 126 are mounted is provided with pivots at the upper right and upper left regions of the recorder in order that a standard tape cassette can be inserted or removed therefrom. As is known in the electronics art these cassettes are readily available in sizes ranging between 30 and 90 minutes of recording time, numbers which contemplate reversal or flipping over of the cassette in the recorder. The identified HS-J600 recorder is, however, provided with automatic tape reverse capability in order that "both sides" of the tape be accessible for long data recordings. The HS-J600 recorder is also provided with a noice reduction system under license from Dolby ® Laboratories; although such noise reduction is desirable in the present use of the recorder, recorders without this feature may also be used.

As is explained is some detail below, use of the FIG. 1 system contemplates the recording of voice data on one stereophonic channel of the recorder 102 while tone coded time signals are recorded on the other "stereo" channel. An indication of the recorded times is presented on the display 106 during both recording and playback uses of the recording system 100. As a result of the relatively small dimensions indicated at 108, 110, and 112 in FIG. 1 in the recording system 100 and the relatively small mass of about 652 grams or 1.2 pounds it is contemplated that the recording system of FIG. 1 can easily be strapped to or attached by Velcro ® fasteners or similar arrangements to the torso or the flight suit of a pilot or aircrewmember that is performing a data gathering mission.

In view of a desire to record all possible comments and data arising during such missions it is contemplated that the recorder 102 once placed into operation for such a mission will run continuously throughout the active part of the mission and be terminated upon mission completion. Alternately the recorder 102 may be stopped occasionally during routine portions of the mission by crewmember operation of the recorder controls. As is also explained below it is contemplated that the timing electronics and the display 106 will continue in operation during stopped portions of such a "substantially continuous" recording sequence in order that time continuity be maintained. The time recording code contemplated for the FIG. 1 system includes a complete coding of time digit at one second intervals as opposed to a code using incremental signals which would require greater amounts of memory in the display.

Figure 2:
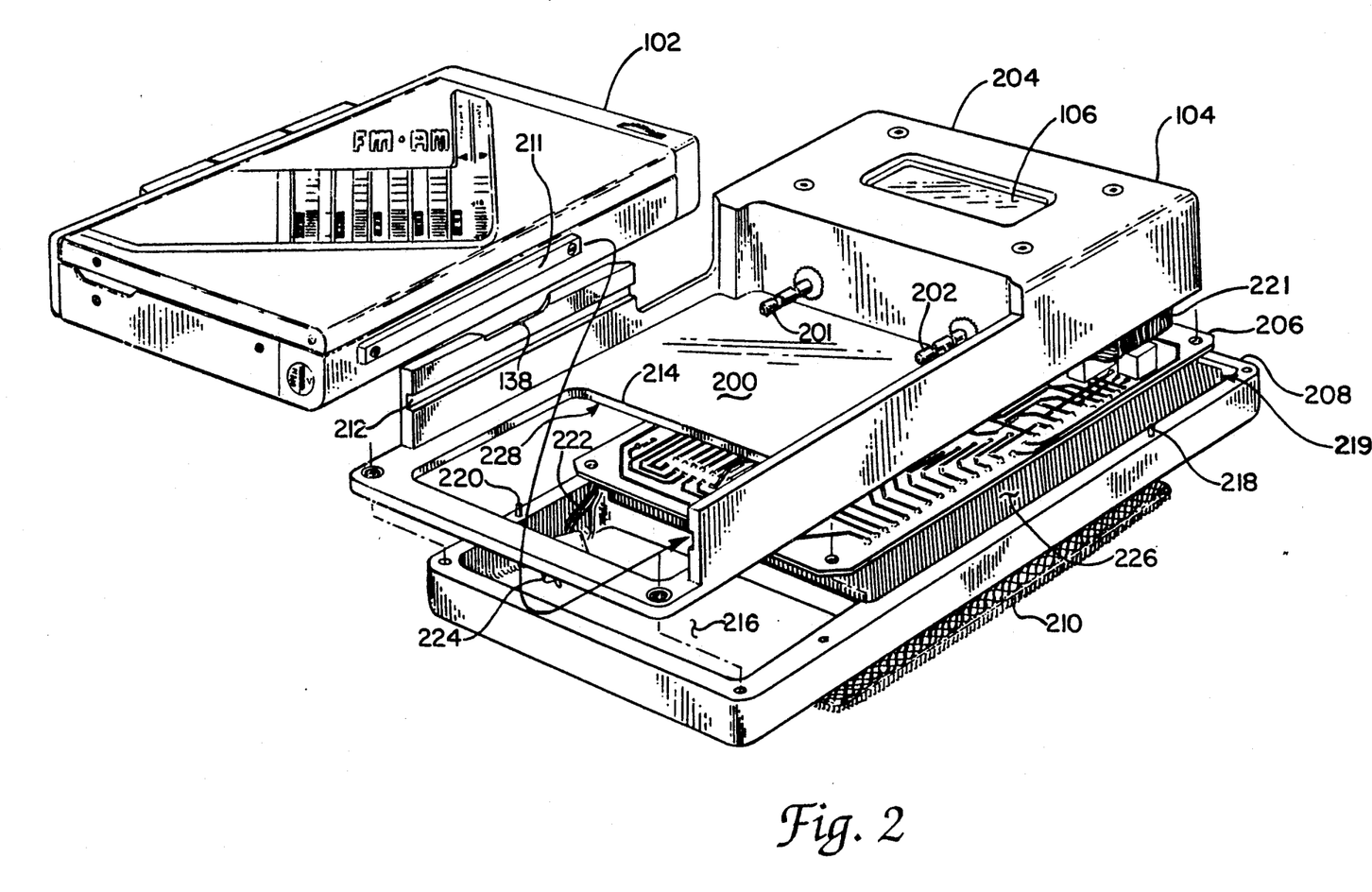
FIG. 2 shows an opposed view-point, exploded perspective view of the FIG. 1 recording apparatus.

FIG. 2 in the drawings shows additional physical details of the FIG. 1 recording system in the form of an alternate viewing point exploded perspective of the FIG. 1 system. In FIG. 2 numbers from the FIG. 1 drawing are repeated for elements commonly shown in the two drawings and new numbers in the 200 series added for the exploded perspective revealed elements. In the FIG. 2 view of the recording system 100 the housing 104 is shown to include a major cavity 200 for receiving the recorder 102 and a minor cavity which includes the cavity aperture 219 and also a cavity receptacle 216 for receiving the battery pack used for operating the clock and tone generator circuit portions of the recording system.

Extending into the major cavity 200 are a pair of male connecting plug members 201 and 202 which are located to mate with correspondingly located microphone and headphone female jacks located in the recorder 102. By way of these jacks and the male and female sliding track members 211 and 212 the recorder 102 can be securely and electively retained in engagement with the housing 104 when in use. The male track member 211 and the similarly located but not shown track member on the oppositely disposed side of the recorder are elements added to the "off the shelf" recorder unit 102 in order to facilitate its use in the present system. Preferably this attachment can be accomplished by way of drilled holes and the illustrated accompanying machine screws connecting with the recorder housing.

As is also illustrated in FIG. 2 the housing 104 is preferably fabricated by way of two portions, an upper body portion 204 and the bottom cap member 208 with these two portions being held together by way of machines screws threaded into the bottom cap 208 at the left most ends of the FIG. 2 drawing and machine screws threaded into the body portion 204 at the right hand end of the FIG. 2 structure. Additionally, a set of four roll pins are disposed along the edges of the bottom cap 208 for engagement with similarly disposed holes in the body 204 for locating the bottom cap and body portions positively during assembly; two of these pins are illustrated at 218 and 220 in FIG. 2.

The Velcro ® pad used for retaining the recorder system on the torso or otherwise in the flight clothing of an aircraft crewmember is illustrated at 210 in FIG. 2; this pad preferably engages with a mating pad located at a convenient spot within the flight clothing. The electrical printed circuit board on which the integrated circuit components used in mechanizing the time and tone circuits of the recorder system is shown at 206 in FIG. 2. This circuit board is preferably mounted by way of machine screws on the bottom cap portion 208 of the housing. In the FIG. 2 arrangement of the invention the integrated circuit packages mounted on the board 206 are faced in the downward direction so that only the printed circuit wiring traces are generally represented in FIG. 2. The circuit board 206 is connected to the display 106 and the body 204 by way of a flat ribbon connector 221 and is additionally tethered to the body 204 by way of plug-on connectors which have a short length of flexible wire connecting with the male plugs 201 and 202 and with the jacks indicated at 114 and 116 and 118. Additionally connected to the printed circuit board 206 is the flexible tether 222 and the plug 224 which together connect with the five volt rechargeable battery pack for the timing and tone generating circuits, this battery pack is of a conventional nature and not shown in FIG. 2. The body portion 204 and the bottom cap 208 in FIG. 2 are preferably made from non metallic machinable materials such as ABS plastic or Delrin ® which are readily available commercially and may of course be replaced with moldable or other low cost materials in high volume uses of the invention.

In the presently described embodiment, the machine screw holes and locating pin holes and cavity aperture and receptacle are preferably machined into the respective portions of the housing; these operations are also replaceable by molding operations as are known in the art.

Figure 3A:
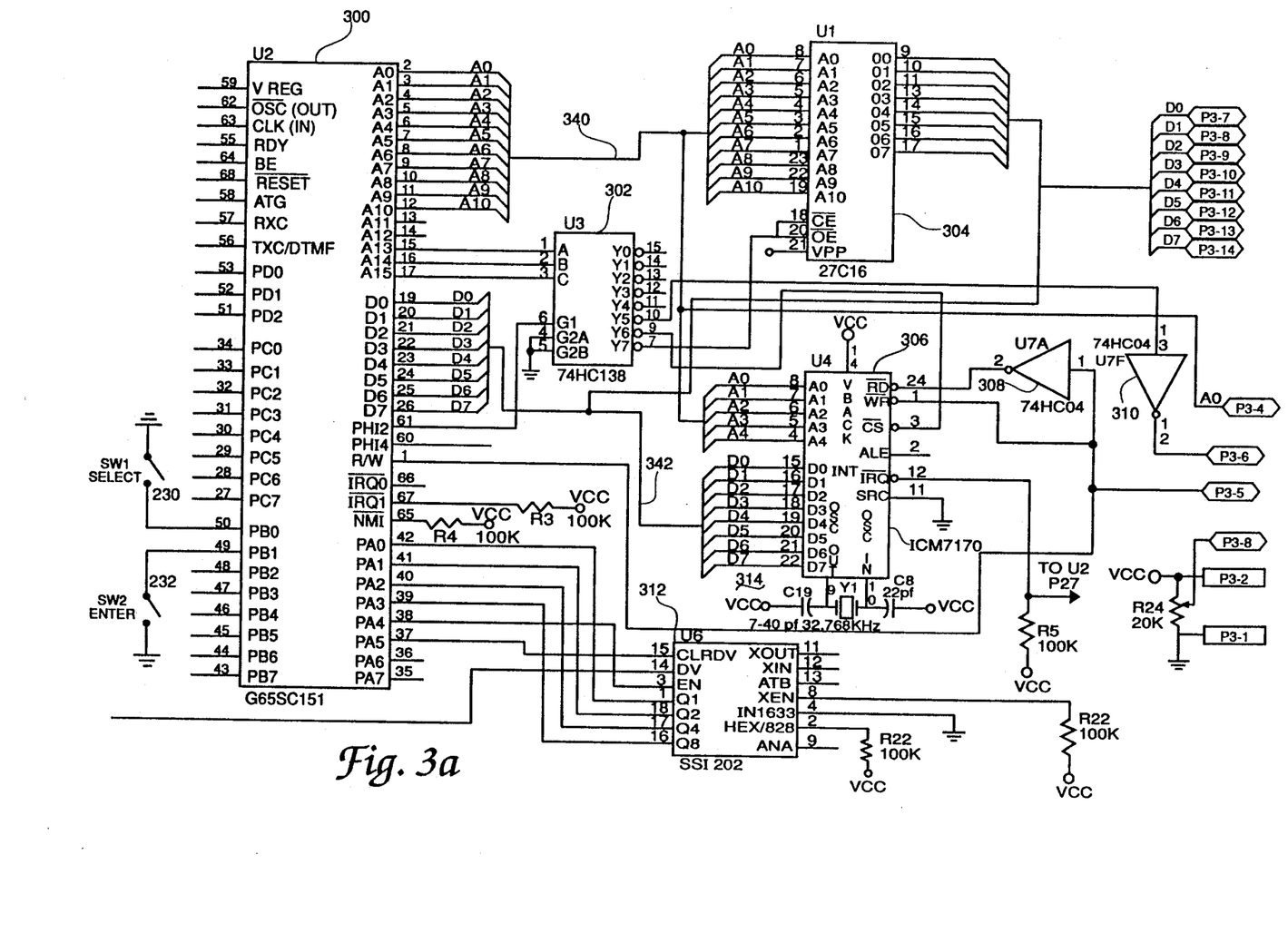
FIG. 3a-b in two parts, shows an electrical schematic diagram for the FIG. 1 and 2 recording apparatus.
Figure 3B:
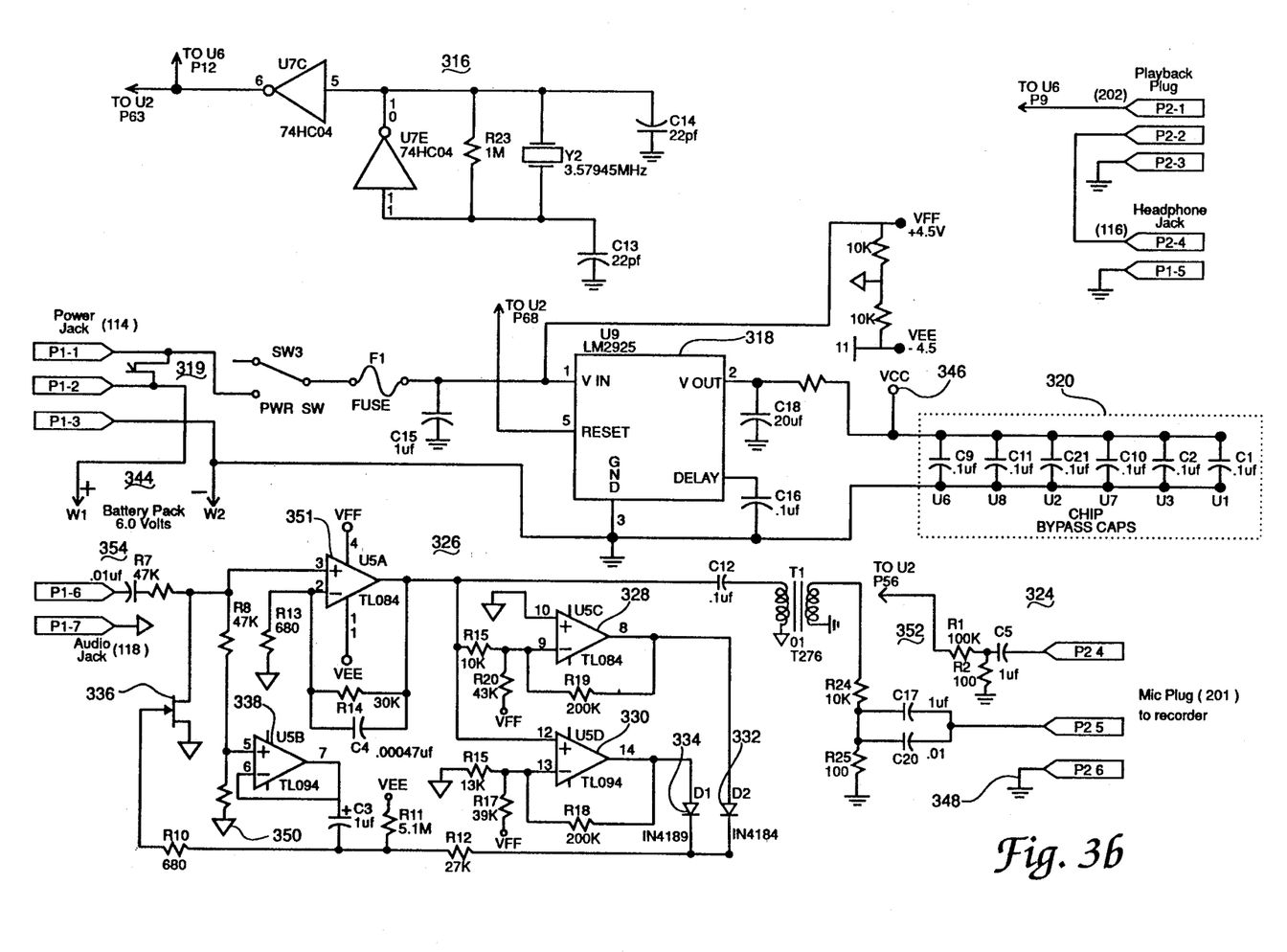

The two portions of FIG. 3 in the drawings, that is FIG. 3a and FIG. 3b, show the electrical schematic diagram of the electronic circuitry used in mechanizing the FIG. 1 recording system 100. In FIG. 3a is shown the major portion of the integrated circuit chip circuitry including the discrete component circuitry surrounding the preferred micro processor chip used in the time and tone portions on the time code generator (TCG) portions of the recording system. In FIG. 3a the microprocessor chip is indicated at 300 and the identification of this chip as a G65SC151 CMOS communications terminal microcomputer is provided. Chips of the G65SC151 nature are available from several sources including GTE Microcircuits Division of California Micro Devices Corp., 215 Topaz Street, Milpitas, Calif. 95035-5430. Data sheets concerning the characteristics of this microcomputer are available from GTE microcircuits and the data sheet dated May 1984 is hereby incorporated by reference herein. Additional information concerning this micro computer is to be found in the publication identified as an application note for the G65SC150 communication microcomputer which is also published by GTE Microcircuits and dated December 1985. The version of this application note dated October 1986 is also hereby incorporated by reference herein.

Also shown in 3a is the real time clock generator chip 306 which functions to generate timing signals that initiate placement of tone coded signals on one channel of the recorder 102 tape in FIGS. 1 and 2. The real time clock generator chip 306 may be a type ICM7170 microchip which is available from the INTERSIL division of General Electric Corporation. The ICM7170 data sheet identified as 301680-005 is also hereby incorporated by reference herein.

Additionally shown in FIG. 3a is the tone decoding circuit chip 312 which functions to generate standard four bit digital output signals in response to receiving dual tone coded information during recording and readout of a tape on the recording system 100 in FIG. 1. The tone decoding chip 312 is identified in FIG. 3a as SSI 202 circuit chip, such chips being manufactured by Silicon Systems Incorporated (SSI ®) of 14351 Myford Road Tustin Calif., 92680; such chips are described in the SSI data sheet dated May 1984 which is also hereby incorporated by reference herein. By way of explanation, the SSI 202 chip provides the dual tone decoding function in the FIG. 3 system. Dual tone, sinusoidal waveform coding of these tone signals according to standardized telephone convention however occurs in the microcomputer chip 300.

Also shown in FIG. 3a is the ROM memory chip 304 which functions to store the program used in the microcomputer 300. The ROM circuit 304 may be of a type 27C16 programmable EPROM which is available from National Semiconductor Corporation ® of Santa Clara, Calif. and other commercial manufacturers and is described in a National Semiconductor catalog of similar circuits, the contents of which are hereby incorporated by reference herein. The 27C16 memory chip is of the ultraviolet light erasable CMOS circuit variety. In a large quantity manufacturing of the present system, the EPROM memory chip 304 may be eliminated through use of a specially programmed microprocessor chip wherein the described control program is stored in the microprocessor at the time of its fabrication.

The eleven bit address bus used to communicate address signals between the microprocessor 300, the ROM memory 304, the real time clock 306, and the display 106 in FIG. 1 and FIG. 2 is shown at 340 in FIG. 3a. The display which can be SANYO ® LCM-565-O1A chip or equipment, is connected by way of the plug P3 which is indicated along the right hand edge of FIG. 3a. In a similar manner the data bus used for communicating data between portions of the recording system is shown at 342 in FIG. 3a. The logic inverters 308 and 310 in FIG. 3a provide logical inversion of connected signals in order to accommodate the display and other chip logical requirements; these inverters are of the specified commercially available types. Additional components shown in FIG. 3a include the frequency controlling network indicated at 314 for the real time clock generator chip 306 and the miscellaneous components used in conjunction with several of the FIG. 3a circuits chips largely in response to requirements stated in the above identified data sheets.

The circuit chip indicted at 302 in FIG. 3a, a 74HC138 type circuit, functions as an address decoder for signals output on the high order three bits of the microprocessor address bus, these signals serving as chip enable signals for the ROM memory real time clock, and display chips as indicated by the connections in FIG. 3a. The U3 designation for the chip 302 and the similar notation on each of the other circuits in FIG. 3 denote a physical location for this chip in one embodiment of the invention.

Generally the FIG. 3a portion of the recording system operates by way of the microcomputer chip 300 sending out an address on the bus 340 to one of the peripheral chips such as the real time clock 306 and then subsequently sending out and receiving back a word of data along the bus 342. Bus operations of this nature are well known in the microcomputer and digital circuit arts. This well known general nature of bus operations together with the specific information available in the data sheets and application notes described above and the detailed circuit chip pin numbers presented in FIG. 3a are believed sufficient to enable persons skilled in the electronic art to comprehend operation of the FIG. 3a described portion of the recording system.

FIG. 3b shows additional details of the circuitry used in the recording system including several circuits which supplement the FIG. 3a circuit chips. At 316 in FIG. 3b for example is shown a crystal controlled clock circuit which operates at the 3.5 megahertz television color-burst crystal frequency. A clock of this nature is specified for frequency reference purposes in the tone chip data sheet discussed above. The destination of the clock signals are identified only with notes in the FIG. 3b drawing in the interest of drawing clarity and simplification.

At 318 in FIG. 3b is shown a voltage regulator chip, which is preferably of the LM2925 type and is commercially available, together with other circuitry used in connection with supplying operating energy to the remainder of the FIG. 3 circuitry. The rechargeable battery pack used for energizing the FIG. 3 circuitry is connected at 344 in FIG. 3 at the W1 and W2 terminals indicated at this point, and representation by the plug 234. The circuit between this battery pack and the regulator circuit 318 is completed by way of a power jack indicated at 319 and the illustrated switch and fuse in FIG. 3b. The voltage energy originating in the battery pack is used directly for VFF purposes in FIG. 3b and after regulation by the circuit chip 318 is used for VCC purposes in FIG. 3b. The bypass capacitor indicated at 320 in FIG. 3b are actually disposed adjacent to each of the other circuit chips in the FIG. 3 system in order to minimize noise and other undesired power supply effects.

In the lower portion of FIG. 3b are shown several circuits elements used to process the voice signal to be recorded on one channel of the tape in the recorder 102 in FIG. 1 and 2. These circuit elements include the audio signal input jack, Pl, and coupling network indicated at 354 in FIG. 3. This jack corresponds to the signal jack at 118 in FIG. 1 as is indicated by the parent reference in FIG. 3.

The circuit following this input jack and coupling network, that is, the circuit generally indicated at 326 in FIG. 3b comprises an automatic gain control network while the circuit at 352 provides coupling of the audio signal into the input jack of recorder 102. The plug indicated at P2 in FIG. 3b corresponds to the male plug indicated at 201 in FIG. 2. The voice information to be recorded is conducted by way of P2 pin 5 while the tone information to be recorded, that is, the tone signal generated in the microcomputer chip 300 in FIG. 3a are conducted by way of the P2 pin 4 conductor. Actually pin 4 of P2 corresponds to the tip and P2 pin 5 corresponds to the sleeve of the male connector shown at 201 in FIG. 2. As can be observed in the circuit networks 324, 352, and 354, AC coupling is used for the recorded signals.

The automatic gain control circuitry 326 in FIG. 3b serves to maintain a somewhat constant recording level for the voice signal channel even though the input signal varies in magnitude over a range even as high as 30 to 40 decibels. The automatic gain control circuit operates by coupling polarized portions of the output signal from the feedback amplifiers 328 and 330 to the rectifying diodes 332 and 334 and thence to the input signals shunting field effect transistors 336. The time constant or time duration of the AGC action is controlled by the buffer amplifier 338 and the one microfarad capacitor, C3, connected between the buffer amplifier output and the AGC feedback path. The one microfarad capacitor is connected to the buffer amplifier 338 rather than to the usual signal in order that a voltage developed in the amplifier 338 is also applied to the gate of transistor 336. The shunting transistor 336 varies the signal voltage dropped across the series 47K resistor R7. The output of the buffer connected operational amplifier 351 is AC coupled to the recorder input jack connection at P2 pin 5 as shown.

Some entertainment recorders usable at 102 in FIG. 1 may also include an automatic gain control circuit. In the present invention recording level control by the combination of this included AGC circuit and the AGC system shown at 326 in FIG. 3b provides the AIWA ® recorder identified above with satisfactory level control ability on both recorded channels.

It will be noted in FIG. 3b that two different forms of the grounding symbol are used. At 348 near the lower right hand corner of FIG. 3b, for example, the conventional three line inverted pyramid symbol is used while at 350 near the bottom left of the AGC circuitry the hollow triangular ground symbol is used. For the present description it is intended that the symbol at 348 represents the common ground and the symbol 350 represents the isolated ground of the AGC circuitry.

Figure 4:
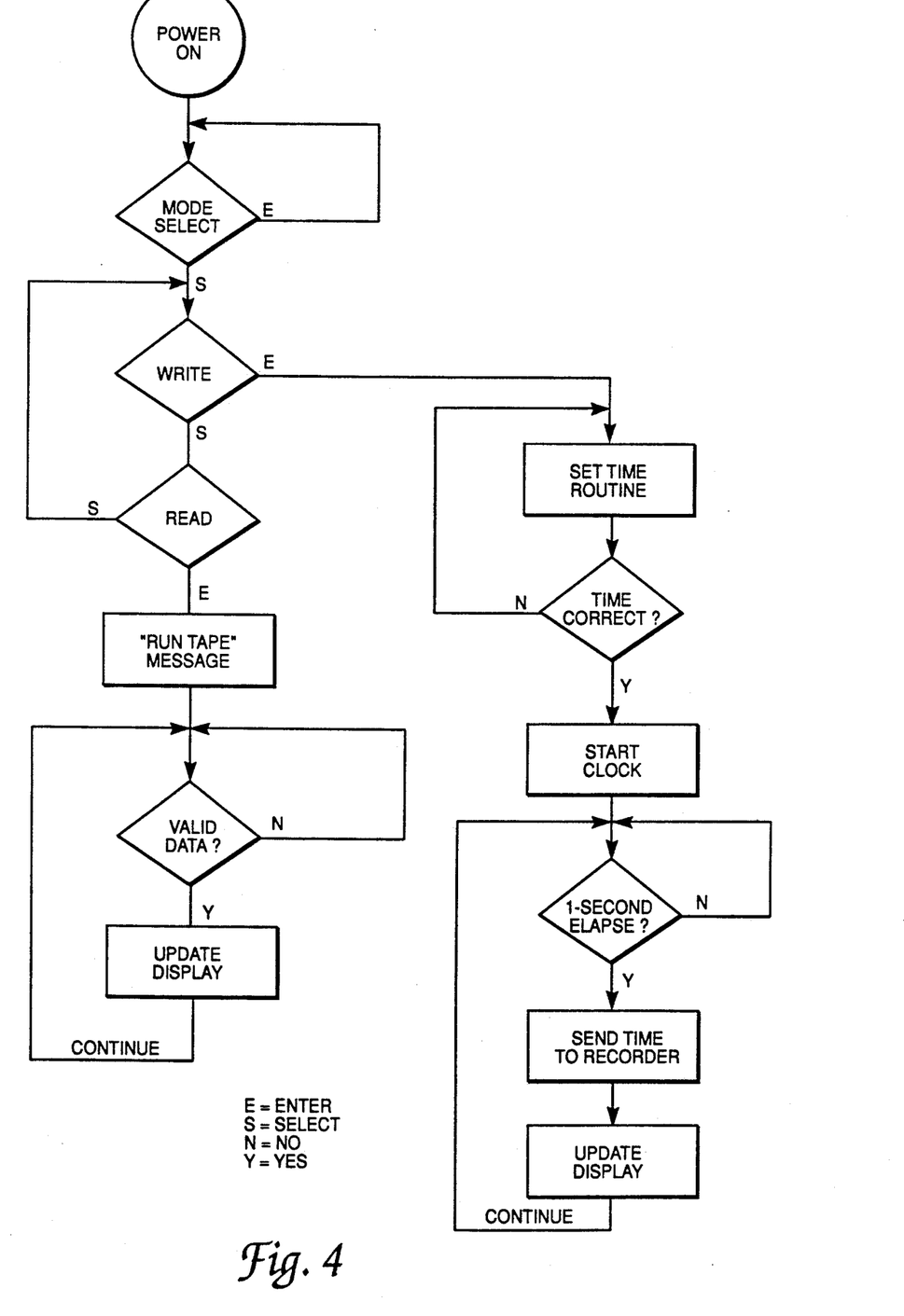
FIG. 4 shows a flow diagram of computer software usable with the present invention.

FIG. 4 in the drawings shows a flow diagram for the assembly language software routine used with the microchip 300 of the recorder system. A complete listing of the assembled version of this program in detailed annotation form is included in the appendix of present document, this appendix being in form of a microfiche copy of 17 pages of assembled program listing. This program listing includes both machine language code and the location of each instruction in memory and includes a descriptive note on most lines of the program along with periodic headnote blocks which identify the operation being performed. The information in these headnote blocks corresponds somewhat with the blocks of the flow diagram in FIG. 4 of the drawings.

By way of explanation, the program listing includes use of the asterisk (*) and the pound sign (#) symbols used to identify keys in the lower row of the standard telephone number keyboard. In the present system, the code for these symbols is used in the tone track of the recorder to indicate the start and termination of each recorded six digit tone group to enable correct interpretation of a tone code sequence even in the event of tape playback startup in a mid digit location. The software listing for these tone groups appears commencing at line 271 and extends for several lines thereafter.

By way of additional explanation commencing at line 770 of the program listing is a group of interrupt "go to" addresses which are actually illegal in the normal flow of the system program. These addresses also include a group of messages to be printed on the display 406 in the event of static electricity or other accidental causes resulting in the execution of one of these illegal interrupt vectors. These messages include the word "darn", the word "oops" and other eye catching language that is calculated to be easily remembered by a technician or by the using aircrewmember in case the recording system and its microprocessor becomes locked-up and unusable. Diagnosis of such a locked-up condition is materially simplified by the simple indication from an aircraft crewmember that the last information appearing on the display was "oops", for example.

Use of the described recorder invention adjacent to the highly static electricity prone artificial fibers textiles used in aircraft flight clothing and flight bags (for example) is found to promote static discharge event generation of noise signals which can be received into various input pins of the integrated circuit chips shown in FIG. 3 and generate computing or other errors. This static discharge and random noise susceptibility in the described embodiment of the invention can, however, be significantly relieved by way of coating the interior surfaces of the bottom cap member 208 in FIG. 2 and the body portion 204 with an antistatic material such as a nickel conductive coating which is available from Miller-Stephenson Chemical Company, George Washington Highway, Danbury, Conn. 06810, as MS-485-nickel conductive coating. Such a coating is indicated at 226 in FIG. 2 for the bottom cap 208. A similar coating is intended on the lower surfaces on the body 204 as is indicated at 228 in FIG. 2.

SYSTEM OPERATION

In the computer software disclosed herein the Time Code Generator (TCG) portions of the FIG. 1 and FIG. 2 recorder system is arranged to be menu driven during system setup. Two push button switches 230 and 232 in FIG. 2 or 122 and 124 in FIG. 1 ("ENTER" and "SELECT" respectively) are used to accomplish the time code setup procedure. Each depression of the "SELECT" push button 230 moves the display to the next available response. When the desired response is received in the display, depressing the "ENTER" push button 232 enters the response data into the TCG and its memory.

For mode selections, when the power switch is turned on, the first information to appear on the display 106 is a flashing "SET MODE". The TCG in fact has two modes which can be selected in response—a "WRITE MODE" to generate the time tone code during recording and a "READ MODE" to play back a time coded recorded tape. Depressing the "SELECT" push button 230 causes the TCG to display either a flashing "WRITE MODE" or "READ MODE". Each depression of the "SELECT" button 230 toggles the display between the "WRITE MODE" and "READ MODE" messages. When the desired mode is shown in the display pressing the "ENTER" button causes the next step in the setup procedure to be displayed.

If the "READ MODE" has been entered, a solid "RUN TAPE" command will be displayed and TCG is ready to read a previously recorded cassette tape. Once the tape has been placed in the tape recorder and the recorder "PLAY" button 136 depressed, the TCG will start displaying the time that it decodes from the tape. To position the tape in a specific position along its length, the standard controls for forward, reverse, start, play, and rewind at 128, 132, 134, and 136 may be used. The tape can be started at any position and the TCG will display the correctly decoded time within one or two seconds. Once the TCG has been set in the "READ MODE" the only exit from this mode is via turning the TCG unit off.

When placed in the "WRITE MODE" during mode selection, the display will flash the message "SET TIME". At this point a depressing of the "ENTER" button fills the display with an all zero display of time digits with a flashing block at the left hand digit. Depressing the "SELECT" button increments this flashing digit through its range of numbers. Once the correct number is in the display a depressing of the "ENTER" button enters that digit into memory and causes the flashing block to move to the next digit. Once again the "SELECT" button may be used to select the desired number and the "ENTER" button to enter it into the digit. This process may be continued until the lowest order minute digit has been set. After the "ENTER" button has been depressed for selecting the lowest order or ones digit of the minutes, the display flashes with the entire entered time number. For the described AIWA recorder, depressing and holding the "record" button and the "play" button accomplishes the start. The "record" button will remain depressed if the recorder is actually in the record mode. To start the TCG clock, depress the "ENTER" button at the moment selected to cause synchronizing with any other clock desired. Once the "ENTER" button has been depressed for this purpose, the only way to change the time settings is to power the TCG off and start again. If the flashing time display is incorrect and a change is desired before pressing the "Enter" button, depressing the "Select" button will return the memory back to a setting of the first time digit.

An example sequence for setting the TCG to commence recording at the time of day of 1330 hours is shown below. The underlined characters represents the flashing block on the TCG display.

| ACTION | Display |
|---|---|
| Turn on power | Flashing "SET MODE" |
| Depress "SELECT" | Flashing "WR MODE" |
| Depress "ENTER" | Flashing "SET MODE" |
| Depress "ENTER" | "00:00:00" |
| Depress "SELECT" | "10:00:00" |
| Depress "ENTER" | "10:00:00" |
| Depress "SELECT" | "11:00:00" |
| Depress "SELECT" | "12:00:00" |
| Depress "SELECT" | "13:00:00" |
| Depress "ENTER" | "13:00:00" |
| Depress "SELECT" | "13:10:00" |
| Depress "SELECT" | "13:20:00" |
| Depress "SELECT" | "13:30:00" |
| Depress "ENTER" | "13:30:00" |
| Depress "ENTER" | Flashing "13:30:00" |
| Depress and hold "RECORD" | ------------ |
| Depress "PLAY" | Tape motion starts |
| Depress "ENTER" at time desired | "13:30:00" goes solid and time code counting starts |

It should be noted that both the setup sequence instructions and the write mode setup example here assume that entry of time of say indicating digits is desired. Actually, however, digits having other time relevance, digits which will be incremented at one second intervals may be entered during the above described setup procedure. Additionally, with modification of the FIG. 3 circuitry and the disclosed software, other time related functions such as tone code at time intervals as small as one hundredth of a second or "alarm" actions after reaching a predetermined time increment may be included in the recorder system times shorter than the tone execution times require additional consideration, however. Such possible modifications to the described system will be appreciated by persons skilled in the electronic art upon consideration of details concerning the ICM 7170 real time clock chip and the related data sheet which was incorporated by reference above—and indeed by such consideration of the other circuit chips characteristics included herein or the similar circuit chips and data sheets from other manufactures.

The recording system of the present invention therefor enables the recording of voice and time data on separate channels of the same recording tape in order to assure a permanent fixed relationship between the time and voice signals. The availability of these time and voice signal simultaneously reduces the effort needed for tape playback and reduces errors in the data analysis in addition to making it possible to make automatic exact time references to the recorded events. The disclosed recorder system may be used in airborne equipment, in laboratory and simulation environments and in fact may be used in any audio frequency recording situation requiring time identification or time indexing of the recorded data.

Since recording tapes can be replaced during use of the recorder the only limitation to recording time is the limit of battery life—or the necessary use of externally supplied energy. The tape reverse feature provided in many recorders permits both "sides" of a recording tape to be used without operator intervention thereby enabling recording up to one and one half hours on a single tape. The use of low cost readily available recording apparatus in the invention not only lowers the initial investment required to accomplish recording but also enables simple throw away maintenance of the recording system if desired and takes advantage of the know-how developed in years of design and perfection of such recording apparatus.

We claim:

1. Airborne time and voice data recovery apparatus comprising the combination of:
   a battery operated portable audio frequency entertainment stereophonic magnetic tape recorder disposable within the flight clothing of an aircraft crewmember and having first and second recording channels for a magnetic recording tape received therein, said recorder including electrical batteries received therein;
   manual elective means enabling starting and stopping of said magnetic recording tape within said recorder during an airborne mission;
   means communicating aircrew member voice determined electrical signals generated during said airborne mission with a signal input port of said first one of said stereophonic tape recorder recording channels, for recording said voice determined signals;
   time code generator means including a crystal controlled clock circuit and telephone dialing format tone code signal generator means controlled thereby had periodically communicating with a signal input port of said second stereophonic tape recorder recording channel for recording periodic bursts of mission time coded telephone dialing format dual tone signals on said recording tape second channel;
   tape playback means including time tone code signal decoding means and decoded dual tone code time display means or playing back said recorded voice determined signals with a concurrent periodically updated readout of mission time associated therewith.

2. The airborne recording apparatus of claim 1 wherein said periodic bursts of time coded telephone dialing format tone are disposed at one second intervals along said recorded tape.

3. The airborne recording apparatus of claim 2 wherein said voice determined signals include aircraft mission related communication signals.

4. Time indexed portable voice data recording an playback apparatus comprising the combination of:
   an entertainment type battery operated portable stereophonic magnetic tape recorder having left and right recording and playback channels for a cassette housed magnetic tape received therein;
   means including a voice responsive microphone for communicating an electrical signal representative of said voice data to a recording input port of a first one of said left and right recording channels;
   means including a plurality of timing circuit responsive audio frequency tone generator circuits selectively and periodically connected with a recording input port for a second of said left and right recording channels for recording periodic bursts of time indicative tone coded signals on said second of said magnetic tape left and right recording channels;
   playback means including time tone code burst decoding circuits for generating and displaying electrical signals representative of said ongoing time during playback of said magnetic tape.

5. The recording and playback apparatus of claim 4 further including portable housing means for holding said magnetic tape recorder, said means for recording time tone code, and said time tone code burst decoding circuits, including said means for displaying, in an integral portable package.

6. The recording and playback apparatus of claim 5 wherein said tape recorder, and said means for recording tone code along with said means for generating and displaying signals representative of recording time are each battery energized and energized from separate and electrically isolated portable housing means received electrical battery packs.

7. The recording and playback apparatus of claim 6 wherein one of said electrical battery packs is rechargeable in nature.

8. The recording and playback apparatus of claim 5 wherein said playback means for generating and displaying also includes means for operating said means for displaying said electrical signals representative of said ongoing time during recording of said magnetic tape.

9. The recording and playback apparatus of claim 5 wherein said portable housing means is comprises of electrically insulating material and includes an anti static electrically conductive coating received on predetermined surfaces thereof.

10. The recording and playback apparatus of claim 4 wherein said tone generator circuits are numerical digit coded according to standardized dual tone push button telephone dial coding protocol.

11. The recording and playback apparatus of claim 4 further including means for maintaining said timing circuit in operation during elective stoppings of said magnetic tape.

12. The recording and playback apparatus of claim 4 wherein said time indicative tone code comprises time of day correlated digits.

13. The recording and playback apparatus of claim 4 wherein said time indicative tone code comprises elapsed time correlated digits.

14. The recording and playback apparatus of claim 4 further including segregated automatic level control circuits for said left and right channels.

15. The recording and playback apparatus of claim 4 wherein said tone generator circuits are received in a micro computer circuit chip.

16. The recording and playback apparatus of claim 15 wherein said microcomputer circuit chip includes a program having eye catching diagnostic display word phrases executable in response to predetermined microcomputer computing events.

17. The recording and playback apparatus of claim 4 wherein said periodic bursts of time indicative tone coded time signals include predetermined code bursts denoting the starting and ending of points a plural digit group of tones.

18. The recording and playback apparatus of claim 17 wherein said starting and end tone groups consist of tones identifying asterisk and sounds sign telephone dial push buttons respectively.

19. The time indexed method for reproducing intermittent voice signals comprising the steps of:

storing said intermittent voice signals along one channel portion of a stereophonic cassette contained magnetic recording tape, recording periodic coded tone burst signals representative of time index intervals along a second channel portion of said stereophonic magnetic recording tape;

reproducing said recorded coded tone burst signals and said stored voice signals from said magnetic tape through segregated data channels during playback of said recorded stereophonic magnetic recording tape;

said stored voice signals being recovered in an audio signal generating data channel; and said recorded tone burst signals being concurrently recovered in a digital time displaying data channel.

20. The method of claim 19 wherein said tone burst signals are dual tone frequency coded with respect to ten possible numbers of a time digit and sequentially disposed along said tape with respect to plural digits in a time word.

21. The method of claim 20 wherein said tone burst signals are disposed at one second intervals along said tape.

22. The method of claim 19 wherein said storing and recording steps include generating an ongoing progression of nonrecorded tone burst controlling timing signals during manual stopping of said tape.

23. The method of claim 19 wherein said recording step includes displaying recorded time index digits during said recording.

* * * * *

UNITED STATES PATENT AND TRADEMARK OFFICE
CERTIFICATE OF CORRECTION

PATENT NO. : 5,225,947
DATED : July 6, 1993
INVENTOR(S) : Glenn F. Wilson et al

It is certified that error appears in the above-indentified patent and that said Letters Patent is hereby corrected as shown below:

Column 1, line 27, a comma should follow "parameters".
Column 1, line 29, the comma should be deleted.
Column 1, line 41, "to..re port" should be ---to report---.
Column 2, line 11, "back" should be ---lack---.

Column 6, line 7, ---rechargeable--- should follow "the".
Column 12, line 31, "say" should be ---day---.
Column 12, line 40, "system times" should be ---system. Times---.
Column 12, line 49, "manufactures" should be ---manufacturers---.
Column 12, line 51, "for" should be ---fore---.

Column 13, line 32, "had" should be ---and---.
Column 13, line 40, "or" should be ---for---.
Column 14, line 28, "comprises" should be ---comprised---.

UNITED STATES PATENT AND TRADEMARK OFFICE
CERTIFICATE OF CORRECTION

PATENT NO. : 5,225,947
DATED : July 6, 1993
INVENTOR(S) : Glenn F. Wilson et al

It is certified that error appears in the above-indentified patent and that said Letters Patent is hereby corrected as shown below:

Column 14, line 60, "time" should be deleted.
Column 14, line 61, "of points" should be --points of--.
Column 14, line 64, "end" should be --ending --.
Column 14, line 65, "sounds" should be --pounds--.

Signed and Sealed this

Twenty-fourth Day of May, 1994

Attest:

BRUCE LEHMAN

Attesting Officer

Commissioner of Patents and Trademarks